United States Patent [19]

Glass et al.

[11] Patent Number: 4,715,171
[45] Date of Patent: Dec. 29, 1987

[54] REEL LIFT MECHANISM FOR MOWER-CONDITIONERS

[75] Inventors: Emmett F. Glass, Akron; Edmund O. Howell, New Holland, both of Pa.

[73] Assignee: New Holland Inc., New Holland, Pa.

[21] Appl. No.: 848,602

[22] Filed: Apr. 7, 1986

[51] Int. Cl.$^4$ ..................... A01D 47/00; A01D 57/04
[52] U.S. Cl. .......................................... 56/192; 56/208
[58] Field of Search .................. 56/192, 208, 220, 221

[56] References Cited

U.S. PATENT DOCUMENTS

| | | |
|---|---|---|
| 4,137,696 | 2/1979 | Webb . |
| 4,227,363 | 10/1980 | Kerber et al. .................... 56/208 X |
| 4,368,609 | 1/1983 | Hutchinson et al. ................. 56/221 |
| 4,377,930 | 3/1983 | Halls et al. ............................ 56/221 |
| 4,622,805 | 11/1986 | Johnson et al. .................... 56/220 X |

Primary Examiner—George A. Suchfield
Attorney, Agent, or Firm—Larry W. Miller; Frank A. Seemar; Darrell F. Marquette

[57] ABSTRACT

A mechanism for lifting the reel on a mower-conditioner relative to the cutterbar when the header is raised to an upward position is disclosed wherein a link is selectively connectable between the reel arms and the mower-conditioner frame to effect a pivotal movement of the reel arms on the header when the header is raised relative to the mower-conditioner frame by the header lift mechanism. The link can be in the form of a flexible chain operatively engaged with a take-up mechanism to permit storage of the chain when placed in an inoperative position or in the form of a rigid link selectively pivotally connectable to both the frame and the reel arms when movement of the reel relative to the cutterbar is desired.

7 Claims, 9 Drawing Figures

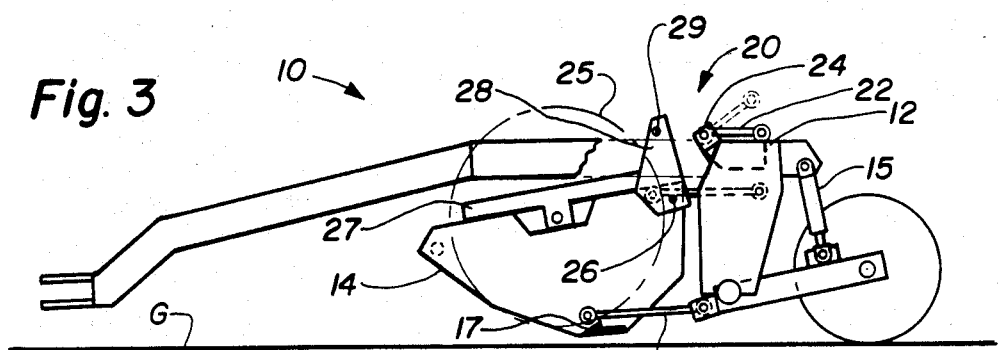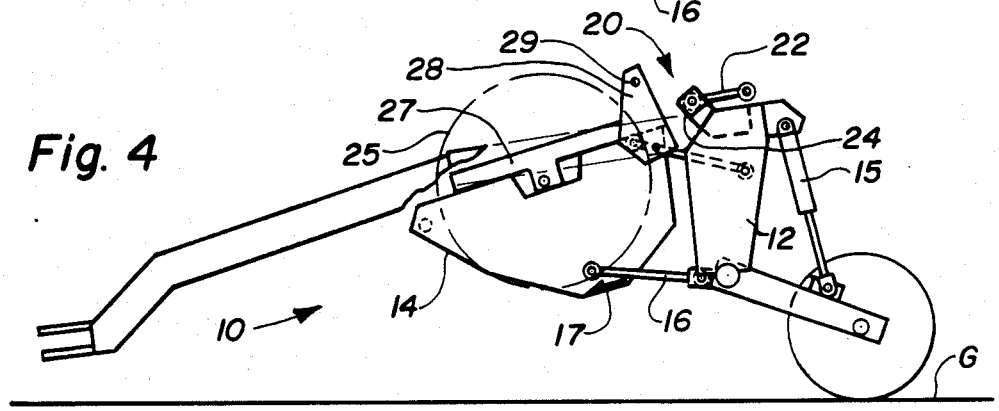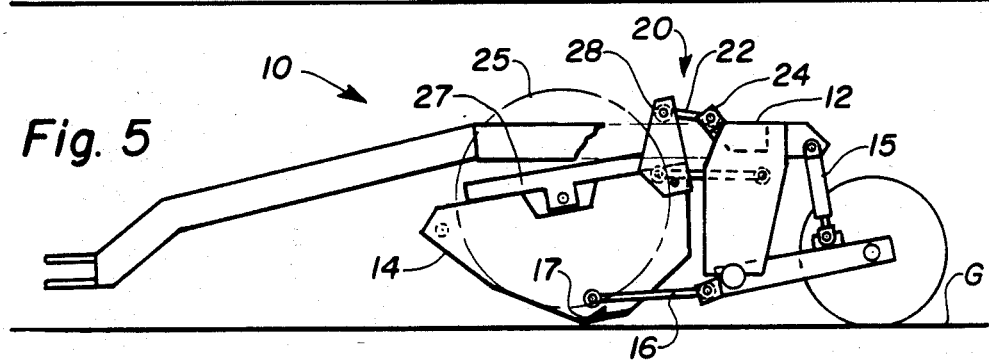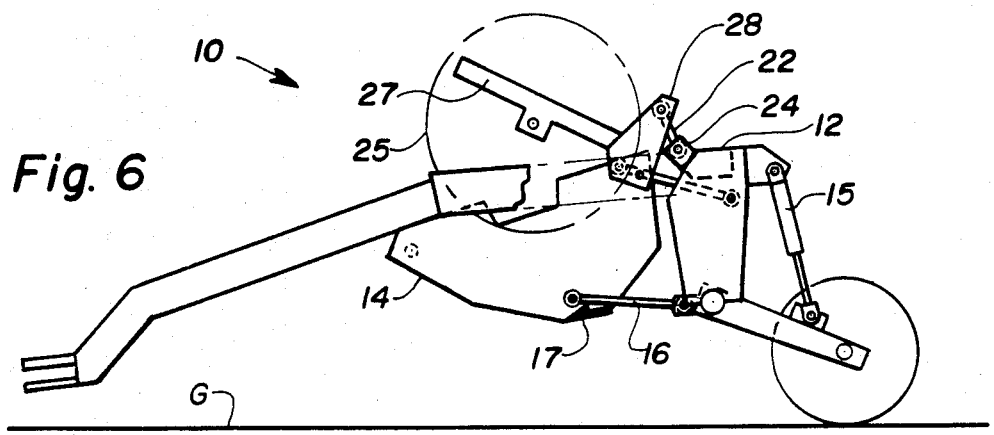

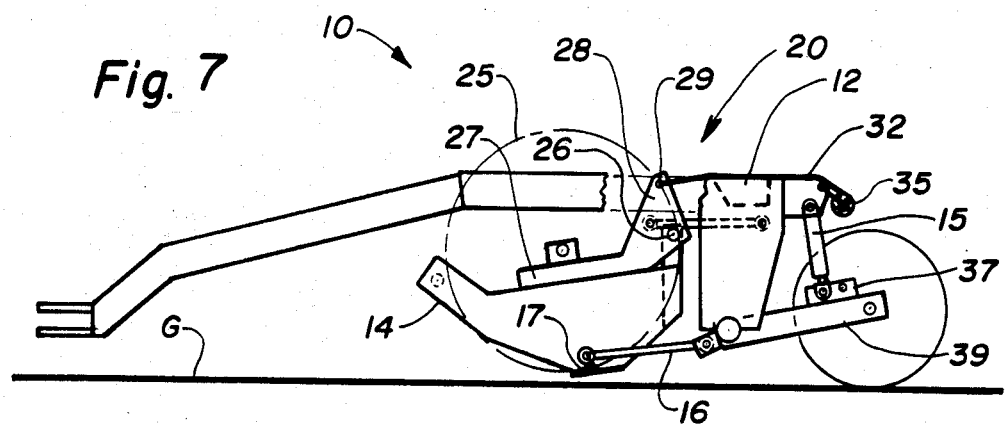
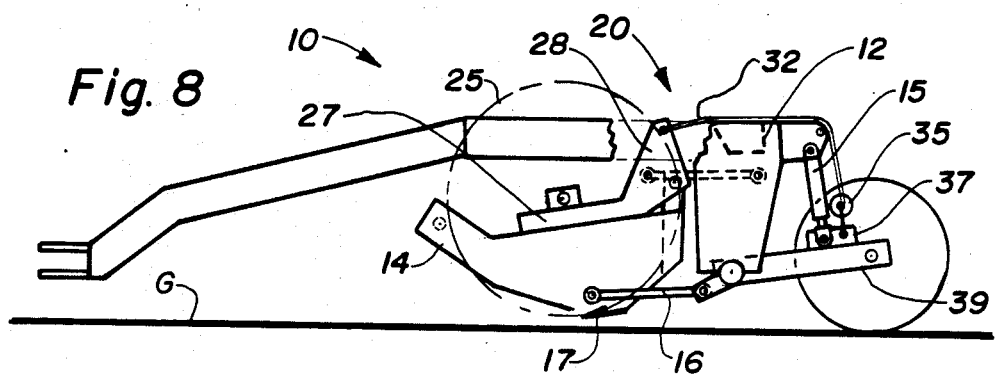
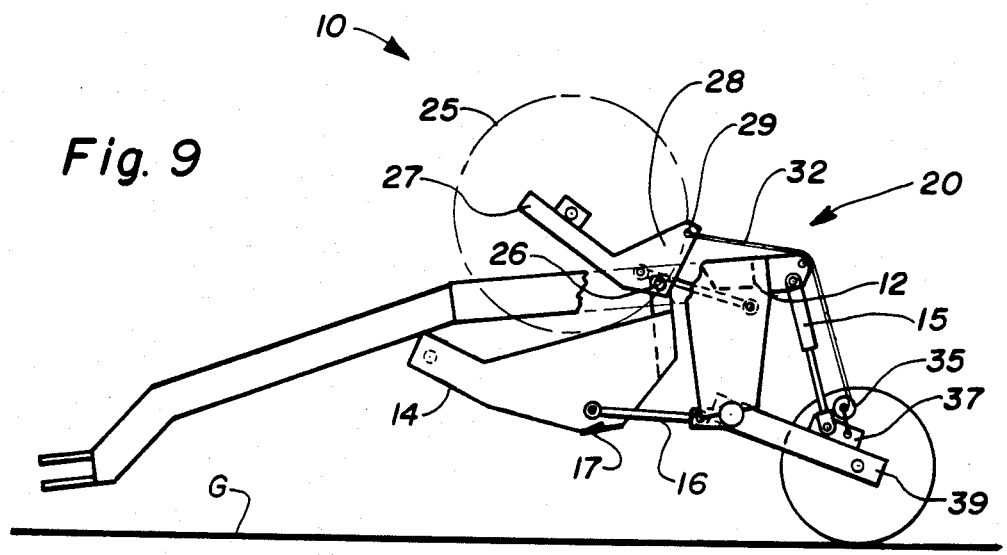

REEL LIFT MECHANISM FOR MOWER-CONDITIONERS

BACKGROUND OF THE INVENTION

The present invention relates generally to mower-conditioners and, more particularly, to a mechanism for lifting the reel relative to the cutterbar when the header is placed in an upward position.

Typically mower-conditioners are equipped with fixed reels mounted directly to the mower-conditioner header and positioned in close proximity to the cutterbar for proper operation thereof to sweep crop material across the cutterbar and rearwardly into a conditioning mechanism. Such reels make serviceability very difficult, even when the header is raised, because accessibility to the cutterbar components, such as the guards, knife sections, etc., is impeded by the close proximity of the reel.

Accordingly, it would be desirable to provide an easily operable, convenient mechanism for gaining an unimpeded access to the cutterbar, particularly when the header is raised into an upward or transport position.

SUMMARY OF THE INVENTION

It is an object of this invention to overcome the aforementioned disadvantages of the prior art by providing a reel lift mechanism to lift a mower-conditioner reel when the header is moved into a raised position.

It is another object of this invention to utilize the movement of the header relative to the frame of the mower-conditioner when moved into a raised position to effect a lifting of the reel relative to the cutterbar.

It is an advantage of this invention that the ease of serviceability of the mower-conditioner cutterbar is greatly improved.

It is a feature of this invention that the mechanism for lifting the reel can be stored in an inoperative position to permit normal operation of the header lift mechanism without raising the reel relative to the cutterbar.

It is still another object of this invention to provide a linkage means selectively interconnectable between the mower-conditioner frame and the reel to affect a pivoting of the reel arms on the header when the header is raised relative to the mower-conditioner frame.

It is another feature of this invention that a flexible chain can be utilized as the link interconnecting the frame and reel.

It is yet another feature of this invention that the flexible link can be engaged with a takeup mechanism to store the flexible link when positioned in an inoperative position.

It is another advantage of this invention that a rigid link selectively interconnecting the mower-conditioner frame and reel can be utilized to pivotally move the reel on the header when the header is moved relative to the frame.

It is yet another object of this invention to provide a reel lift mechanism for use on a mower-conditioner which is durable in construction, inexpensive of manufacture, carefree of maintenance, facile in assemblage, and simple and effective in use.

These and other objects, features and advantages are accomplished according to the instant invention by providing a mechanism for lifting the reel on a mower-conditioner relative to the cutterbar when the header is raised to an upward position wherein a link is selectively connectable between the reel arms and the mower-conditioner frame to effect a pivotal movement of the reel arms on the header when the header is raised relative to the mower-conditioner frame by the header lift mechanism. The link can be in the form of a flexible chain operatively engaged with a take-up mechanism to permit storage of the chain when placed in an inoperative position or in the form of a rigid link selectively pivotally connectable to both the frame and the reel arms when movement of the reel relative to the cutterbar is desired.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 3 is a schematic left side elevational view of a mower-conditioner incorporating the principles of the instant invention, the pivotal movement of the rigid link selectively connectable to the reel arms being shown in phantom;

FIG. 4 is a schematic left side elevational view of the mower-conditioner seen in FIG. 3 with the header raised into a raised position by the header lift mechanism with the reel lift linkage in an inoperative position;

FIG. 5 is a schematic left side elevational view of a mower-conditioner with the reel lift linkage interconnecting the frame and reel while the header is in a lowered position;

FIG. 6 is a schematic left side elevational view of a mower-conditioner seen in FIG. 5 with the header raised into a raised position by the header lift mechanism;

FIG. 7 is a schematic left side elevational view of a mower-conditioner incorporating a second embodiment of the reel lift linkage shown in an inoperative position with the header in a lowered position;

FIG. 8 is a schematic left side elevational view of the mower-conditioner seen in FIG. 7 with the reel lift linkage interconnecting the reel arms and the frame while the header is in a lowered position; and FIG. 9 is a schematic left side elevational view of the mower-conditioner seen in FIG. 8 with the header raised into a raised position by the header lift mechanism.

DETAILED DESCRIPTION OF THE PREFERRED EMBODIMENT

Figure 1:
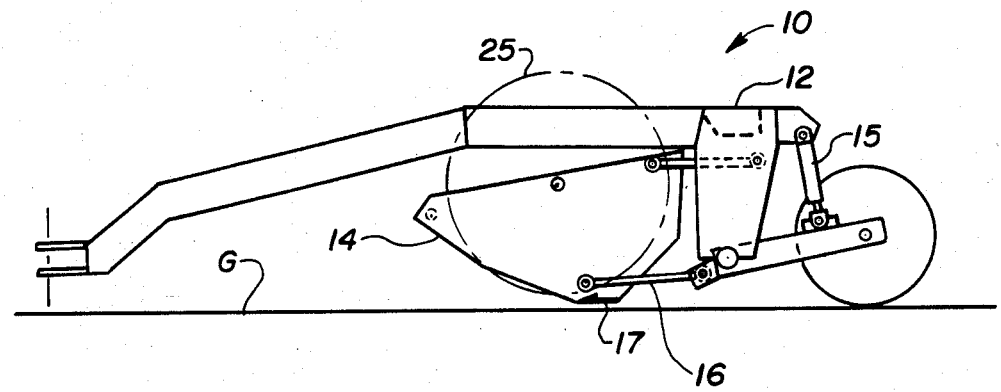
FIG. 1 is a schematic left side elevational view of a mower-conditioner forming the prior art to which this invention is an improvement, with the reel mounted in a fixed location on the header.
Figure 2:
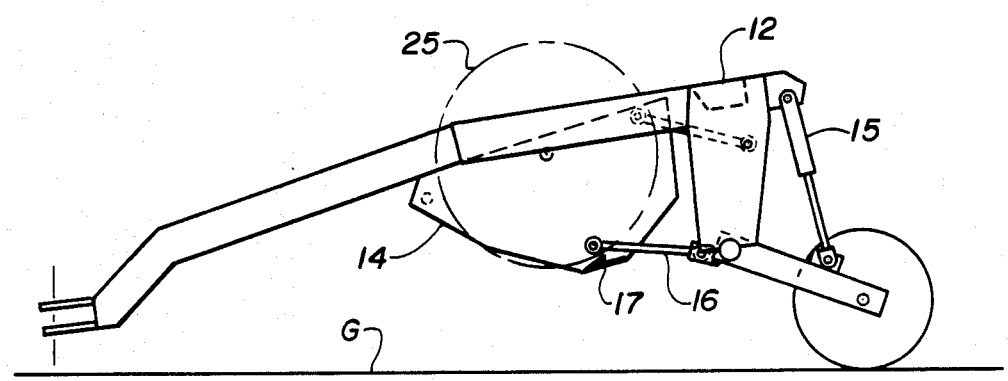
FIG. 2 is a schematic left side elevational view of the mower-conditioner seen in FIG. 1 with the header moved into a raised position by the header lift mechanism.

Referring now to the drawings and, particularly, to FIGS. 1 and 2, a mower-conditioner forming the state of the prior art to which the instant invention is an improvement is schematically shown between a field operating position and a transport position. This particular mower-conditioner 10 utilizes a header lift mechanism of the type shown and described in U.S. Pat. No. 4,137,696, issued on Feb. 6, 1979, to Bryant F. Webb, the description of which is incorporated herein by reference. This type of header lift mechanism 15 affects a raising of the frame 12 of the mower-conditioner 10 relative to the ground G, but also affects a raising of the header 14, which is suspended from the frame 12 for floating movement over the ground G by the header lift linkage 16, relative to the frame 12 when moved into the raised transport position, as shown in FIG. 2, by the header lift mechanism 15.

Referring now to FIGS. 3–6, the rigid link version of the instant invention can best be seen. The linkage mechanism 20 is shown in the form of a rigid link 22 pivotally connected to a mounting tab 24 and movable from an inoperative position, as shown in FIGS. 3 and 4, to a connected position as depicted in FIGS. 5 and 6. The reel 25 is rotatably supported by a pair of transversely spaced reel arms 27 pivotally connected on the header 14 for movement relative to the cutterbar 17, as seen in FIG. 6. The reel arms 27 are provided with a mounting leg 28 extending upwardly therefrom and provided with a linkage connecting hole 29, which in turn is spaced upwardly from the pivotal connection 26 between the reel arms 27 and the header 14.

One skilled in the art will readily realize that the link 22 can be stored in an inoperative position either on the mounting tab 24 adjacent the frame 12 or on the mounting leg 28 adjacent the reel arm 27. Whenever it is desired to have the reel 25 moved upwardly away from the cutterbar 17, such as for servicing the components of the cutterbar 17, the link 22 is connected between the mounting tab 24 and the mounting leg 28 and the header raised into a raised position by the header lift mechanism 15. With the type of header lift mechanism noted above, the header 14 is lifted relative to the frame 12, as can be seen in a comparison of FIGS. 5 and 6. Since the mounting link 28 of the reel arms 27 is connected to the frame 12, the relative movement between the header 14 and the frame 12 causes the reel arm 27 to pivot about its pivotal connection 26 and raise the reel 25 relative to the cutterbar 17, as seen in FIG. 6.

Referring now to FIGS. 7–9, an alternative embodiment of the linkage mechanism 20 can be seen. Instead of a rigid link 22 as shown in FIGS. 3–6, the linkage mechanism 20 includes a flexible chain 32 guided over the frame 12 and engaged with a takeup mechanism 35. The use of the takeup mechanism 35 serves to store an extra length of the chain 32 while the linkage mechanism 20 is placed in the inoperative position shown in FIG. 7. Although in FIG. 7 the takeup mechanism 35 is connected to the frame 12, the takeup mechanism 35 permits the chain 32 to be played out without exerting any force on the mounting leg 28 of the reel arm 27. One skilled in the art will readily realize that appropriate guides and/or sprockets (not shown) can be provided to properly guide the chain 32 over the frame 12.

In order to lift the reel 25 relative to the cutterbar 17, the takeup mechanism 35 can be attached to the mounting tab 37 on the wheel strut 39, at which point the length of the chain 32 is fully extended so that any movement of the header 14 relative to the mounting tab 37 on the wheel strut 39 will result in a force exerted on the mounting leg 28 and pivotally rotate the reel arms 27 about its pivotal connection 26, as shown in FIG. 9. Again, as noted with respect to FIGS. 3–6 above, the relative movement of the header 14 with respect to the frame 12, as caused by the header lift mechanism 15 noted above, causes the pivotal movement of the reel arm 27 to lift the reel 25 away from the cutterbar 17 and permit convenient access thereto.

One skilled in the art will readily realize that other mounting positions of the linkage mechanism 20, as well as storage positions while in the inoperative position, can be easily devised and are fully equivalent to those described above. The exact geometry between the relative sizes and positionings of the mounting tabs 24,37 and the links 22,32 can be appropriately determined to provide the desired amount of vertical separation between the reel 25 and the cutterbar 17.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a mower-conditioner having a mobile frame adapted for movement over the ground; a header suspended forwardly of said frame for movement relative to said frame, said header including a cutterbar mounted thereon at a forward extremity of said header to sever standing crop material from the ground and crop conveying means for conveying crop material within said header including a rotatable reel, said crop conveying means being pivotally connected to said header to position said reel above said cutterbar for cooperative association therewith to harvest crop material from the ground; and header lift means for raising said header relative to said frame, the improvement comprising:

linkage means selectively interconnectable between said frame and said crop conveying means for affecting a raising of said reel relative to said cutterbar when said header lift means raises said header relative to said frame.

2. The mower-conditioner of claim 1 wherein said crop conveying means further includes a pair of transversely spaced reel arms pivotally mounted on said header and rotatably carrying said reel, said linkage means being selectively connectable between said frame and said reel arms.

3. The mower-conditioner of claim 2 wherein each said reel arm includes a mounting leg having a linkage connection point spaced from the pivotal connection between the respective said reel arm and the header, said linkage means including a link selectively connectable between said linkage connection point and a mounting tab affixed to said frame.

4. The mower-conditioner of claim 3 wherein said link is flexible and is engaged with a take-up mechanism for storage of at least a portion of said flexible link while placed in an inoperative position.

5. The mower-conditioner of claim 4 wherein said take-up mechanism is operable to fix the length of said flexible link when selectively interconnected between said linkage connection point and said mounting tab to effect movement of said reel relative to said cutterbar when said header is raised relative to said frame.

6. The mower-conditioner of claim 3 wherein said link is rigid and pivotally connectable to said mounting arm and said mounting tab.

7. The mower-conditioner of claim 6 wherein said mounting tab carries said rigid link in an inoperative position, said rigid link being selectively connectable to said mounting arm to move said rigid link into an operative position to affect a movement of said reel relative to said cutterbar when said header is raised relative to said frame.

* * * * *